June 11, 1968 R. DALLY 3,387,849

TONE ARM AND CARTRIDGE COMBINATION

Filed Jan. 4, 1965

INVENTOR:
ROY DALLY,

BY Thomas A. Briody
HIS ATTORNEY.

United States Patent Office 3,387,849
Patented June 11, 1968

3,387,849

TONE ARM AND CARTRIDGE COMBINATION

Roy Dally, Warrensburg, Ill., assignor to General Electric Company, a corporation of New York Filed Jan. 4, 1965, Ser. No. 423,189
6 Claims. (Cl. 274—24)

ABSTRACT OF THE DISCLOSURE

A tone arm and cartridge combination wherein these two audio components are readily secured together by means of a threaded stud which effectively cooperates with the free end of a tubular tone arm. An automatic means is also provided for electrically coupling the cartridge to wires carried by the tone arm.

This invention relates to an improved electromechanical transducing assembly for audio reproduction from disc type records, and more particularly to an improved arrangement of a stylus carrying cartridge on a tone arm.

The usual type of phonograph, whether it be of the single-record play or automatic changer variety, includes an elongated tone arm that is mounted near its rearward end for pivotal movement about a substantially horizontal axis. This tone arm carries a pickup cartridge near its forward end, and one or more record tracking styli are carried by the cartridge for playing back a record. In one form of this type of phonograph which has seen widespread prior art usage, the cartridge is clipped into cooperative engagement with the forward end of the tone arm, by means of suitable hardware involving a plurality of additional parts. To thus support the cartridge on the tone arm requires a plurality of extra parts. For replacing or removing this type of cartridge from the tone arm, individual leads passing through or underneath the tone arm, are usually disconnected from contact pins of the cartridge, after the cartridge has been uncoupled from its fastening hardware. Uncoupling of the cartridge from the tone arm thus requires several separate operations.

It has been found desirable to provide a new and improved tone arm and cartridge assembly which involves a minimum of parts fŏr coupling the cartridge to the tone arm, and which may be uncoupled in an extremely simplified fashion. Accordingly, an important object of my invention is to provide a new and improved coupling for a cartridge and a tone arm, which is very simplified in construction and operation.

Another object of my invention is to provide an improved tone arm and cartridge combination which includes a novel and effective means for coupling and uncoupling the cartridge from the tone arm.

An additional object of my invention is to provide an improved tone arm and cartridge mechanism which is efficient, dependable, and very economical to manufacture.

A further object of my invention is to provide a new and improved means for electrically connecting a phonograph cartridge to leads emanating from the tone arm.

A still further object of my invention is to provide a new and improved means for mechanically coupling a phonograph cartridge to a tone arm.

In accordance with my invention, in one form thereof, there is provided an elongated tubular tone arm pivotally supported at one of its ends for movement about a substantially horizontal axis. Near the other end of the tone arm a recess is formed on the underside of the tone arm. A threaded aperture is formed on the tone arm in communication with the recess. With such an arrangement, a pickup cartridge including a record-tracking stylus is provided for association with the tubular tone arm. The cartridge includes a housing having an upright appendage on the top thereof. The appendage of the cartridge housing is fitted into cooperative engagement with the tone arm recess, and a threaded stud is engaged with the threaded aperture for engaging the appendage of the cartridge to secure the cartridge to the tone arm. Such an arrangement removably secures the cartridges to the tone arm with a minimum amount of hardware and in very simplified fashion. If it becomes desirable to remove the cartridge from the tone arm, merely loosening a single stud allows the cartridge to drop downwardly and disengage itself from the tone arm.

By a further aspect of my invention, I provide an improved arrangement for readily connecting and disconnecting audio amplifier leads to the pickup cartridge from the tone arm. This improved arrangement may, of course, be combined with the aforesaid structure to provide a particularly desirable tone arm and cartridge combination. In this arrangement, a plurality of resilient contacts are arranged on an insulative connector secured to the underside of the tone arm. These contacts resiliently and electrically engage wire leads of the pickup cartridge which are arranged in upwardly facing fashion on a rearward extension of the cartridge housing. Thus, when the cartridge is secured to the tubular tone arm, the resilient contacts of the tone arm, which are connected to the audio amplifier means, resiliently engage the cartridge leads. When the cartridge is uncoupled from the tone arm, the electrical connections to the cartridge are automatically disconnected. Such an arrangement is effective, convenient, and readily manufacturable.

Further aspects of my invention will become apparent hereinafter, and the specification concludes with claims particularly pointing out and distinctly claiming the subject matter which I regard as my invention. The invention, however, as to organization and method of operation, together with other objects and advantages thereof, may best be understood by reference to the following description when taken in conjunction with the accompanying drawing, in which:

Figures 1, 2, 3, 4, 5, 6:
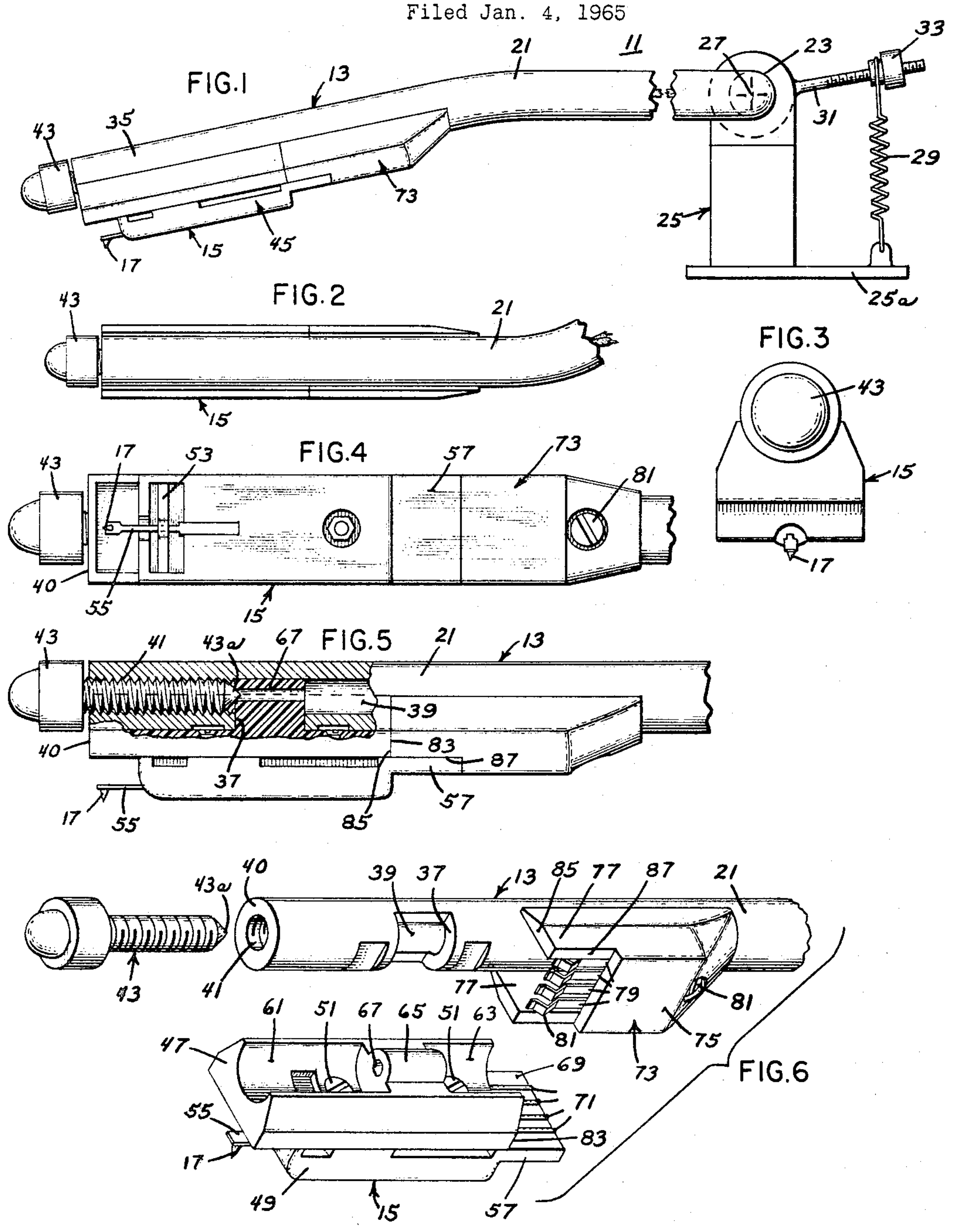
FIG. 1 is a side elevation view of an improved cartridge and tone arm assembly embodying my invention.
FIG. 2 is a fragmentary top view of the assembly shown in FIG. 1.
FIG. 3 is a front view of the assembly shown in FIG. 1.
FIG. 4 is an enlarged bottom view of the assembly shown in FIG. 2.
FIG. 5 is a fragmentary enlarged view similar to FIG. 1, but showing the cartridge and tone arm partially broken away to illustrate the means for fastening the cartridge to the tone arm.
FIG. 6 is an exploded perspective view of the free end portion of the tubular tone arm, the pickup cartridge, and its associated fastening screw.

Referring first to FIG. 1, there is shown a cartridge and tone arm assembly 11 embodying one for of my invention. The assembly 11 includes an elongated tone arm 13 having a cartridge 15 mounted thereon. The cartridge 15 has at least one stylus 17 adapted to track in the groove of a sound reproducing record.

The tone arm 13 includes an elongated tubular body comprising a substantially cylindrical and hollow arm section 21 extending outwardly in cantilever fashion from a pivotally supported end portion 23. As shown in FIG. 1, end portion 23 of the tone arm body is pivotally secured to a suitable support 25 to provide a substantially horizontal tone arm axis 27 about which the tone arm rocks incident to the placing of the tone arm on a disc type record and lifting the tone arm from the record. The pivoting of the tone arm 13 about the tone arm axis 27 permits a wide range of vertical movement of the tone arm and thereby enables a substantial group of stacked records to be accommodated on the record spindle of an automatic changer without impairing the effective operation of the assembly 11.

For normally biasing the free end of tone arm 13 to a predetermined position about its horizontal axis 27, a control spring 29 is connected between an elongated threaded stud 31 and the bottom part 25*a* of support 25. Stud 31 is secured to the supported end portion 23 of the tone arm and cooperates with a threaded nut 33 which helps to support one end of the spring 29 and selectively vary the biasing force provided thereby. For rotating the tone arm 13 about a vertical axis, the bottom parts 25*a* of support 25 rotates in a plane perpendicular to the page on which the illustrative FIG. 1 of the drawing appears.

To enable the cartridge 15 to be mounted on the tone arm 13 in very simplified fashion, in accordance with one important aspect of my invention, there is provided near free end 35 of arm 13, a recess 37. The recess 37, which is shown clearly in FIG. 6, is located on the underside of the tubular tone arm, and is formed by cutting out a transverse bottom portion of the tubular material comprising the tone arm. Recess 37 communicates with the hollow inner portion or bore 39 of the tubular tone arm.

At the front end 40 of tone arm 13, there is also formed therein a threaded bore portion 41 which extends rearwardly of the tone arm (as shown in FIG. 5) and communicates with the recess 37. The purpose of bore portion 41 is to receive an elongated thumbscrew 43 in the form of a threaded stud. Thumbscrew 43 may be tightened or loosened in such a manner as to conveniently secure cartridge 15 to tone arm 13, as shall become apparent hereinafter.

Turning now to the structure of the cartridge 15, which forms an important cooperative part of the embodiment of my invention, attention is directed to FIGS. 2, 4 and 6. The cartridge 15 is of the ceramic stereo type, and it comprises a housing 45 which is composed of upper part 47 and lower part 49 attached together by screws 51. The interior of housing 45 is partially hollow, and contains a pair of elongated ceramic transducer elements (not shown) and a resilient element 53 (FIG. 4) for coupling these elements to an elongated drive rod 55. The drive rod 55 has the stylus 17 secured to the underside of its free end (as shown in FIGS. 5 and 6). Drive rod 55 is suitably supported on the bottom of the cartridge housing 45.

As further shown in FIG. 6, the upper part 47 of housing 45 is offset somewhat from the lower part 49 of the housing, so that a forward portion of part 47 is generally disposed above drive rod 55 but does not overlie lower part 49. By the same token, a rearwardly extending flat portion 57 of the lower part 49 of the housing is positioned relative to upper part 49 so that it does not underlie upper part 49.

In the top surface of upper part 47 of the housing, there are formed front and rear channel portions 61 and 63, and an upright appendage 65 therebetween. The front channel portion 61 is somewhat longer than rear channel portion 63, but both of these channels are in axial alignment and have a substantially cylindrical configuration for enabling them to cooperate with the external cylindrical surface of the tubular tone arm.

The appendage 65 is disposed between the two substantially cylindrical channels 61 and 63, extends transversely relative to drive rod 55, and comprises a substantially cylindrical elongated projection which extends upwardly from above the top of the cartridge housing. An aperture 67 is formed through the transverse appendage so that it opens into the front and rear thereof. Aperture 67 has a relatively small diameter, and has its axis parallel to the longitudinal axis of drive rod 55.

As further shown in FIG. 6, on the top surface 69 of the rearwardly extending flat portion 57 of bottom housing part 49, there are suitably positioned four bared leads 71. These leads 71 are connected inside of the cartridge housing to the aforementioned ceramic transducer elements, and are arranged in parallel spaced apart fashion on top 69 of housing part 49 such as by being cemented thereto, or by their positioning in open parallel grooves.

Rearwardly of the recess 37 of tubular tone arm 13, there is secured to the underside of the tone arm, a connector assembly 73. The connector assembly 73 includes an insulating body 75 having forward parallel shoulders 77, four resilient contacts 79 which extend forwardly from the main portion of body 75 of the assembly 73 and are disposed between shoulders 77 and a screw 81 which cooperates with a threaded aperture (not shown) on the underside of the tubular tone arm for securing the connector assembly 73 thereto. The contacts 79 are suitably supported in cantilever fashion from the inside of a cavity effected between the rear portion of connector body 75 and the underside of the tubular tone arm, and are connected to appropriate audio amplifier leads which are brought through the bore of the tubular tone arm and emanate from the tubular tone arm at a suitable existing slot (not shown) disposed above the connector body 75.

The resilient contacts 79 are disposed in parallel spaced apart relationship and are also parallel to the longitudinal axis of the tone arm in the vicinity of its free end. Contacts 79 also each include a V-shaped contacting portion 81 near their free ends, which face downwardly from the underside of the tone arm 13.

Turning now to an explanation of the mode of operation of my new and improved tone arm and cartridge combination, attention is directed to FIGS. 5 and 6. When the cartridge 15 is uncoupled from the tone arm, let it be assumed that the relative disposition of the cartridge 15 with respect to the free end of the tone arm 13, is as illustrated in FIG. 6. When it is desired then to install the cartridge 15 on the tone arm, the appendage 65 of the cartridge 15 is inserted in the recess 37 of the tone arm so that aperture 67 of the appendage 65 is located coaxially in bore 39. With the cartridge housing thus positioned on the underside of the tubular tone arm, the cylindrical channels 61 and 63 of the top part 47 of the cartridge housing snugly cooperate with the external cylindrical surface of the tone arm. Thumbscrew 43 is then threaded into engagement with the threaded portion 41 of tone arm bore 39. It will be noted that the outer end of the threaded shank of thumbscrew 43 has a conical point 43*a* formed thereon. The conically pointed end 43*a* of thumbscrew 43 is thereupon tightened into cooperation with the forwardly facing end of appendage aperture 67 to securely and positively position the cartridge 15 on the tone arm 13. By means of the cooperation of the conical end 43*a* of the thumbscrew 43 with appendage aperture 67 of the cartridge housing, a precise horizontal and vertical positioning of the cartridge with respect to the tone arm is readily effected.

When the cartridge 15 is mechanically coupled into engagement with tone arm 13 by means of thumbscrew 43, the bared lead wires 71 of the cartridge are automatically electrically coupled to the wires passing through the tone arm, by means of the resilient engagement of the V-shaped contacting portions 81 of connector contacts 79 with the respective wires 71. Thus, more particularly, when the cartridge 15 is mechanically coupled to the tone arm 13 in the manner previously described, the rear end 83 of the upper part 47 of the cartridge housing is contiguous to the front ends 85 of the shoulders 77 of the connector body, and the flat rearward upper surface 69 of lower cartridge body 49 is positioned against downwardly facing surfaces 87 of the shoulders 77, as shown in FIGS. 5 and 6. Each of the resilient contacts 79 thus electrically engages an associated one of the bared wires 71, by means of its depending V-shaped contacting portion 81.

It will thus be seen that my improved tone arm and cartridge combination provides a simplified and effective structure for electrically and mechanically coupling the cartridge to the tone arm.

For removing the cartridge 15 from tone arm 13, all that the operator needs to do is to loosen the thumbscrew 43. When the thumbscrew is losened within its threaded bore portion 41, the conical end 43*a* of the thumbscrew disengages aperture 67 of the cartridge appendage 65. The cartridge 15 is thereupon allowed to mechanically uncouple itself by means of gravity, it being assumed that there is no frictional engagement between appendage 65 and recess 37 which might otherwise prevent this gravitational uncoupling.

When the cartridge 15 is mechanically uncoupled from the tone arm by loosening thumbscrew 43, this automatically facilitates the electrical uncoupling of the bared leads 71 from contacts 79.

It will thus be seen that my invention also provides a novel, simplified, and effective means for electrically and mechanically uncoupling a cartridge from a tone arm.

While in accordance with the Patent Statutes, I have described what at present is considered to be the preferred embodiment of my invention, it will be obvious to those skilled in the art that various changes and modifications may be made therein without departing from the invention and I, therefore, aim in the followng claims to cover all such equivalent variations as fall within the true spirit and scope of the invention.

What I claim as new and desire to secure by Letters Patent of the United States is:

1. A tone arm and cartridge assembly comprising a pickup cartridge including a record-tracking stylus, said cartridge including a housing having an upright appendage on the top thereof, an elongated tone arm of cylindrical tubular construction having a recess formed on the underside thereof near the free end of said tone arm, said housing also having a pair of cylindrical channels one of which is located on each side of the appendage, said channels being constructed to snugly cooperate with cylindrical surfaces of an elongated tone arm near the free end thereof, said recess of said tone arm being dimensioned to receive the appendage of said cartridge, a threaded aperture formed on said tone arm and communicating with said recess, and a threaded stud rotatably cooperable with the threaded aperture of said tone arm a free outer end of said stud disposed within said threaded aperture, said stud being disposed with its longitudinal axis extending in a generally horizontal direction, said stud also being rotatably mounted upon said tone arm so that the free and outer end of said stud is compressibly engageable with the appendage of the cartridge for effectively securing said cartridge to said tone arm.

2. The tone arm and cartridge assembly described in claim 1 wherein the threaded stud has a conical outer end which cooperates with an aperture formed in said cartridge appendage thereby to positively position said cartridge with respect to said tone arm.

3. The tone arm and cartridge assembly described in claim 1 wherein the appendage extends generally transversely to the longitudinal axis of the tone arm near its free end.

4. A tone arm and cartridge assembly comprising an elongated tone arm of cylindrical tubular construction having a free end; a pickup cartridge including a record-tracking stylus, said cartridge including a housing having an upright appendage on the top thereof, and also including a pair of cylindrical channels one of which is located on each side of the appendage, said channels being constructed to snugly cooperate with cylindrical surfaces of the tone arm near the free end thereof; fastening means for mechanically coupling said cartridge to said tone arm near its free end and allowing said cartridge to uncouple itself in response to the force of gravity when a retaining force imparted by said fastening means is released; and contact means for automatically electrically coupling said cartridge to wires carried by said tone arm when said cartridge is mechanically coupled to said tone arm by said fastening means and automatically uncoupling said cartridge from the wires carried by the tone arm when said cartridge is mechanically uncoupled from said tone arm by said fastening means, said contact means including a plurality of resilient contacts directly and selectively engageable with said wires thereby to provide the electrical coupling of said cartridge to the wires carried by said tone arm.

5. The tone arm and cartridge assembly described in claim 4 wherein the fastening means includes a thumbscrew in threaded engagement with said tone arm.

6. The tone arm and cartridge assembly of claim 5 wherein the fastening means includes an appendage formed on the top of the cartridge which cooperates with a recess of the tone arm, said thumbscrew being engageable with said appendage for securing the cartridge to the housing.

References Cited

UNITED STATES PATENTS

| | | | |
|---|---|---|---|
| 2,265,840 | 12/1941 | Hutter | 274—24 |
| 2,532,377 | 12/1960 | Spiegel | 179—100.41 |
| 2,451,221 | 10/1948 | Hutter | 274—24 |

LEONARD FORMAN, *Primary Examiner.*

F. J. D'AMBROSIO, *Assistant Examiner.*